US007921953B2

(12) United States Patent
Irvine

(10) Patent No.: US 7,921,953 B2
(45) Date of Patent: Apr. 12, 2011

(54) PERSONAL MOBILITY DEVICE

(75) Inventor: James Graham Irvine, Dallas, TX (US)

(73) Assignee: JGI Holdings, LLC, Dallas, TX (US)

(*) Notice: Subject to any disclaimer, the term of this patent is extended or adjusted under 35 U.S.C. 154(b) by 116 days.

(21) Appl. No.: 12/464,218

(22) Filed: May 12, 2009

(65) Prior Publication Data

US 2010/0288575 A1 Nov. 18, 2010

(51) Int. Cl.
*B62K 15/00* (2006.01)
*A61G 5/10* (2006.01)
*A47C 7/50* (2006.01)

(52) U.S. Cl. ............ 180/208; 135/66; 135/67; 180/907; 280/250.1; 280/304.1; 297/423.12; 297/423.13

(58) Field of Classification Search .................... 135/66, 135/67; 180/208, 907; 280/30, 87.021, 87.041, 280/47.38, 47.4, 250.1, 304.1; 297/423.12, 297/423.13
See application file for complete search history.

(56) References Cited

U.S. PATENT DOCUMENTS

| | | | | |
|---|---|---|---|---|
| 3,629,880 | A * | 12/1971 | van Rhyn | 5/83.1 |
| 3,872,945 | A * | 3/1975 | Hickman et al. | 180/65.6 |
| 4,054,319 | A * | 10/1977 | Fogg et al. | 297/466 |
| 4,456,086 | A * | 6/1984 | Wier et al. | 180/11 |
| 4,589,699 | A * | 5/1986 | Dungan | 297/423.12 |
| 4,744,578 | A * | 5/1988 | Stearns | 280/250.1 |
| 4,802,542 | A | 2/1989 | Houston et al. | |
| 4,807,897 | A | 2/1989 | Schultz | |
| 4,809,997 | A * | 3/1989 | Owens | 280/211 |
| 5,137,102 | A * | 8/1992 | Houston et al. | 180/65.51 |
| 5,340,139 | A | 8/1994 | David | |
| 5,520,402 | A * | 5/1996 | Nestor et al. | 280/250 |
| 5,884,935 | A * | 3/1999 | Tholkes | 280/657 |
| 6,125,957 | A * | 10/2000 | Kauffmann | 180/65.1 |
| 6,440,046 | B1 * | 8/2002 | Tholkes | 482/142 |
| 7,614,639 | B2 * | 11/2009 | Tholkes et al. | 280/638 |

FOREIGN PATENT DOCUMENTS

| | | | |
|---|---|---|---|
| DE | 203 04 977 | U1 | 6/2004 |

* cited by examiner

*Primary Examiner* — Paul N Dickson
*Assistant Examiner* — Laura Freedman

(57) ABSTRACT

A personal mobility device comprising an open frame having a front structure, a rear structure, and a side structure. The side structure has an upper rail and a lower rail coupleable to the front structure and the rear structure. In one embodiment, a main mobility wheel is coupled to the side structure, and a knee rest is rotatably coupled to the front structure. The knee rest is adjustable from a first substantially-vertical position coupled to the front structure to a second rearwardly and downwardly-angled position from the front structure.

22 Claims, 12 Drawing Sheets

PERSONAL MOBILITY DEVICE

TECHNICAL FIELD

This application is directed, in general, to a personal mobility device and, in one example, to a personal mobility device that is convertible to: a self-propelled or assistant-propelled wheelchair, a self-propelled or assistant-propelled kneeling mobility device, a self-propelled or assistant-propelled standing mobility device, or a self-propelled walker.

BACKGROUND

Wheelchairs are used to move a person with a handicap or disability from one location to another. Conventional wheelchairs are constructed to transport a person with a handicap or disability in a sitting position. Such wheelchairs are usually configured as a chair supported by a tubular framework. A pair of relatively large drive wheels, rotatably mounted upon the framework, are positioned so that hand rails attached to the wheels may be grasped by the user and rotated to move the wheelchair from one location to another. A pair of castered wheels are journaled to the framework to enable concurrent rotation about a horizontal and a vertical axis. When differential torque is applied to the drive wheels, the user can steer the wheelchair to effect a desired direction and movement.

Depending upon the nature of the disability, the person with such disability may eschew use of the hand rails on the wheels for motion and instead propel himself with his feet as though walking, but in a sitting position. The typical wheelchair may be either occupant-propelled or assistant-propelled. Some wheelchairs also provide a specific walking option, i.e., the person with a disability may raise the seat and place himself between the hand rails facing the "back" of the wheelchair and thereby use the wheelchair as a walker.

It is well known that a person with certain debilitating diseases or injuries often progresses directly from walking erect to sitting in a wheelchair. Often, this transition is never reversed and the person remains indefinitely in the wheelchair while the lower limbs atrophy.

For persons with disabilities, standing vs. sitting has been determined to improve function of the cardiovascular system, reduce muscular spasticity, reduce the risk or severity of contractures, improve renal function, benefit digestion and bowel and bladder function, release pressure from sensitive areas and bony prominences, promote more dynamic strength and motor control, enhance circulation, reduce the risk of skin breakdown and pressure sores, and reduce the risk of osteoporosis. Additionally, a standing device vs. a sitting device could potentially improve a person's ability for more eye-level socialization, and facilitate social and professional interactions in home or work environments.

A typical Walker is designed for those persons with limited balance but with enough lower body strength to lift their legs to a new position and enough upper body strength to lift the Walker to a new position.

What is needed in such art is a mobility device that assists a person to transition to and from a sitting position while using the lower extremities to the maximum possible potential to delay/avoid atrophy.

SUMMARY

One aspect provides a personal mobility device comprising an open frame having a front structure, a rear structure, and a side structure. The side structure has an upper rail and a lower rail coupleable to the front structure and the rear structure. In one embodiment, a main mobility wheel is coupled to the side structure, and a knee rest is rotatably coupled to the front structure. The knee rest is adjustable from a first substantially-vertical position coupled to the front structure to a second rearwardly and downwardly-angled position from the front structure.

BRIEF DESCRIPTION

Reference is now made to the following descriptions taken in conjunction with the accompanying drawings, in which.

DETAILED DESCRIPTION

Figure 1A:
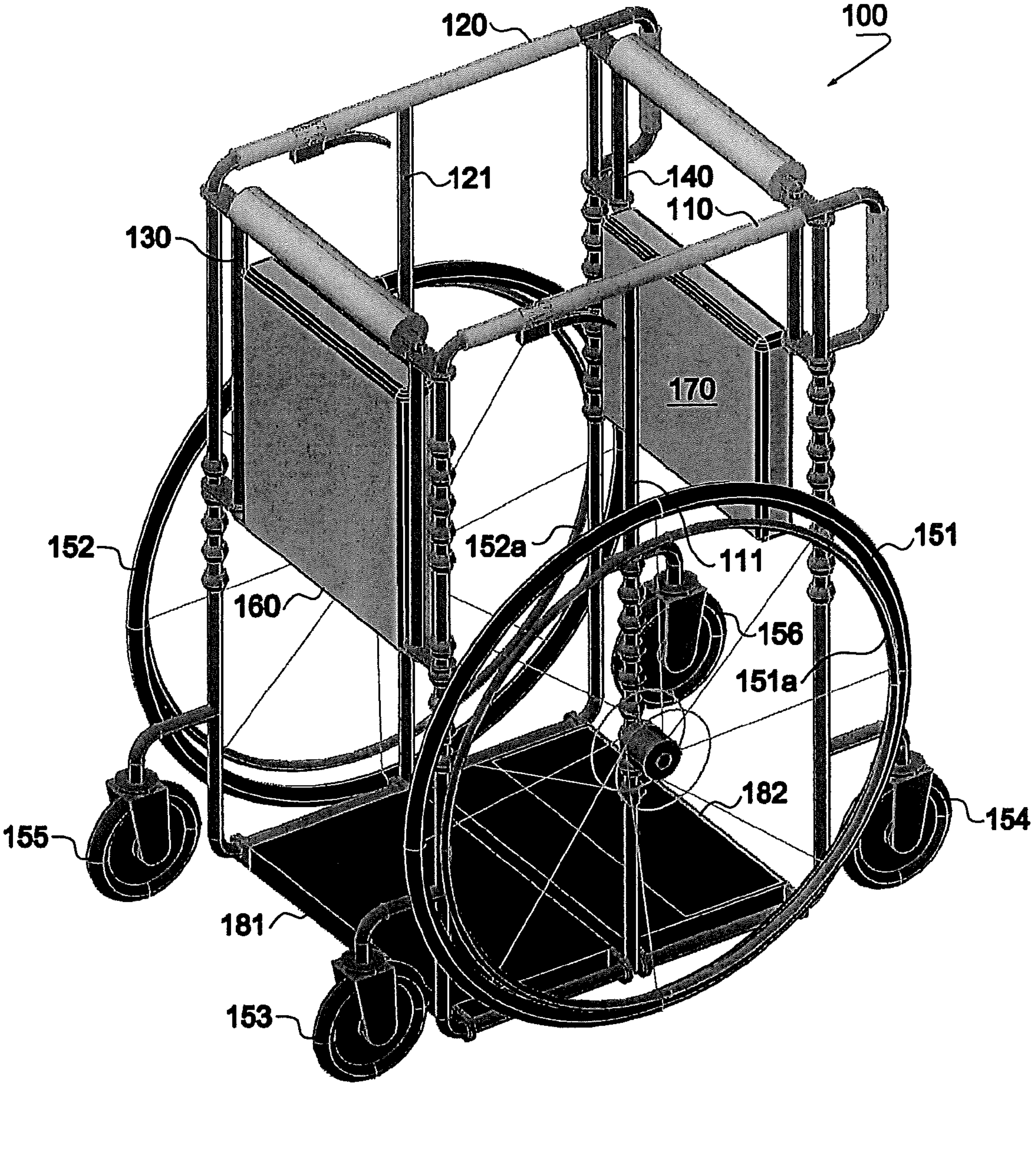
FIG. 1A is a left front isometric view of one embodiment of a personal mobility device constructed according to the principles of the present invention.

Referring initially to FIG. 1A, illustrated is a left front isometric view of one embodiment of a personal mobility device 100 (e.g., convertible personal mobility device) constructed according to the principles of the present invention. The personal mobility device 100 comprises an open frame having a left side structure 110; a left intermediate vertical support 111; a right side structure 120; a right intermediate vertical support 121, a front structure 130; a rear structure 140; left and right main mobility wheels 151, 152, respectively; first through fourth auxiliary wheels 153-156; a knee rest 160; a seat 170; a front floor panel 181; and a rear floor panel 182. The term "mobility wheel" as used herein is intended to include all wheels that an occupant can reasonably use to self-propel the mobility device and/or occupant. As shown in the embodiment of FIG. 1A, the left and right main mobility wheels 151, 152, respectively, are positioned such that the occupant may propel the vehicle himself with his hands. For example, the left and right main mobility wheels 151, 152, respectively, may have hand rails 151*a*, 152*a* as in conventional wheel chairs. The first through fourth auxiliary wheels 153-156 provide anti-tip stability to the mobility device 100. For the purposes of this discussion, the occupant of the personal mobility device 100 will be referred to as the "occupant" and, left and right are the occupant's left and right as seated, kneeling or standing within the device.

Figure 1B:
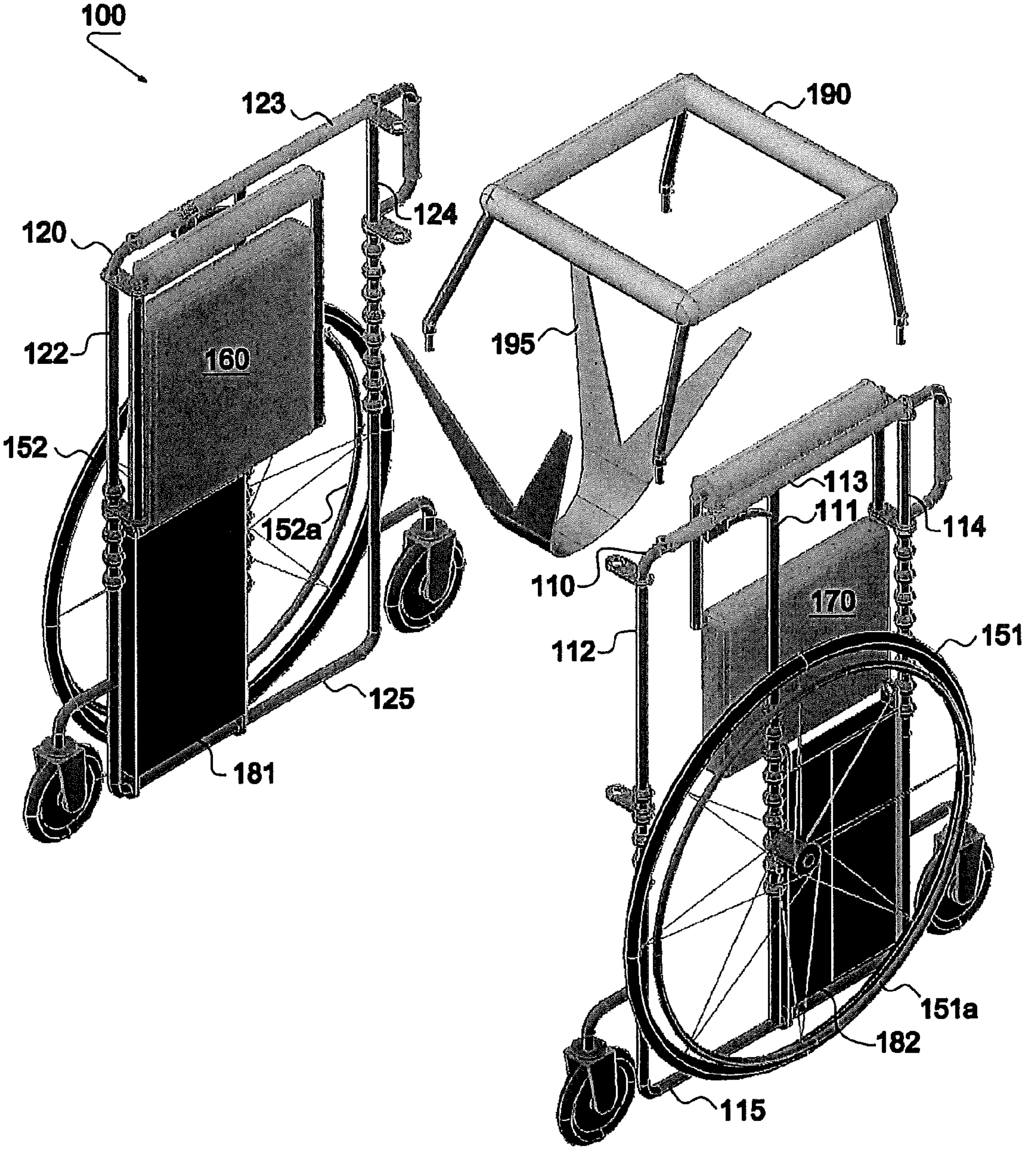
FIG. 1B is a left front partially disassembled, isometric view of the personal mobility device of FIG. 1A folded for storage and transport.

Referring now to FIG. 1B, illustrated is a left front partially disassembled, isometric view of the personal mobility device 100 of FIG. 1A folded for transport or storage. FIG. 1B illustrates the ease with which the personal mobility device 100 can be folded for storage or vehicle transportation. The left side structure 110 further comprises: a left front vertical support 112, a left upper rail 113, a left rear vertical support 114 and a left lower rail 115. The right side structure 120 further comprises: a right front vertical support 122, a right upper rail 123, a right rear vertical support 124 and a right lower rail 125. Front floor panel 181 is shown detached from the left lower rail 115 and folded into substantial alignment with the right side structure 120. The knee rest 160 is shown detached from the left front vertical support 112 and also folded into substantial alignment with the right side structure 120. Rear floor panel 182 is shown detached from the right bottom rail 125 and folded into substantial alignment with the left side structure 110. The seat 170 is shown detached from the right front vertical support 122 and also folded into substantial alignment with the left side structure 110. An optional upper torso support 190 and an optional body sling 195 are also shown and may each be rendered substantially planar for storage or vehicle transportation.

Figure 2:
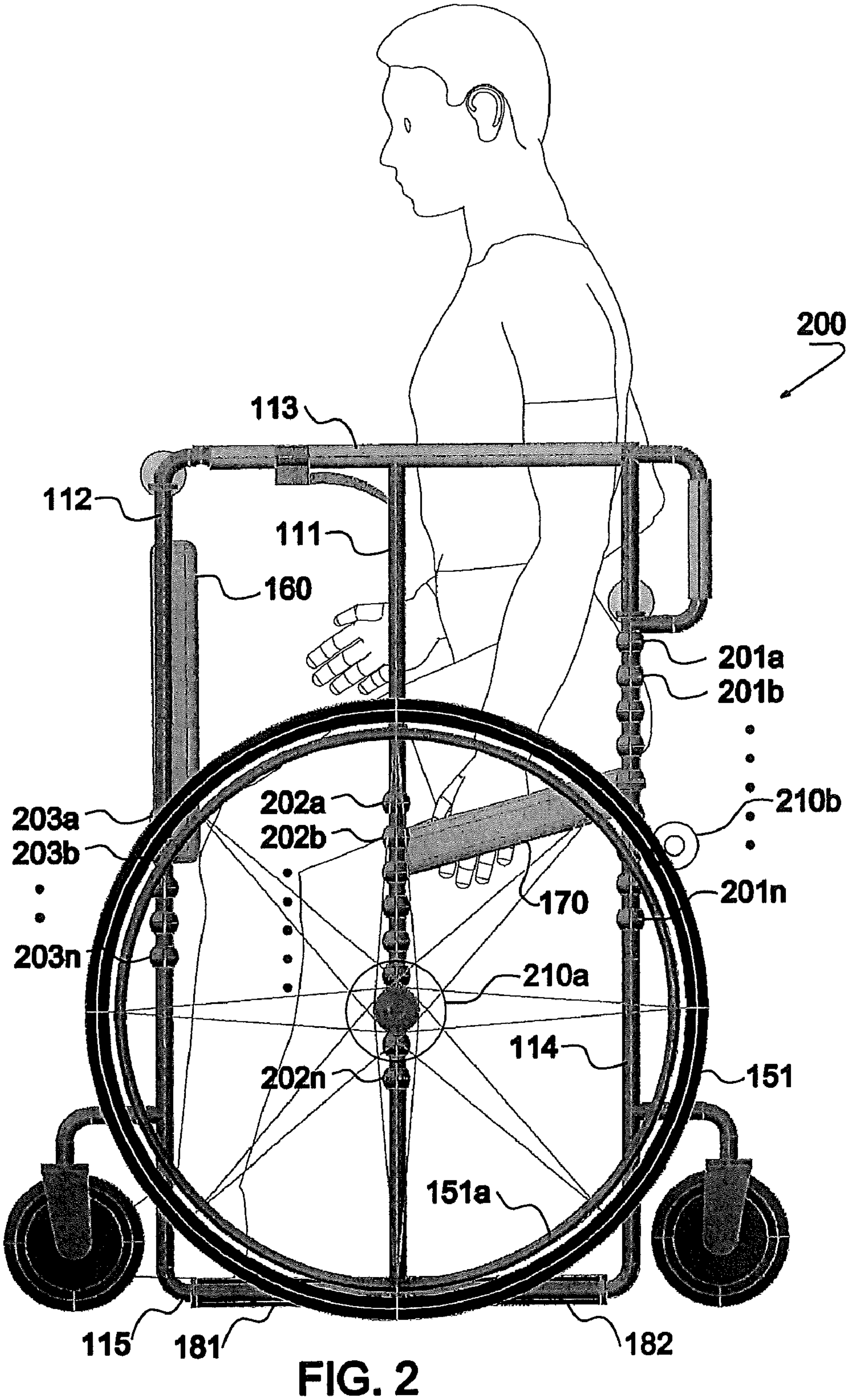
FIG. 2 is a left side elevation view of a second configuration of the personal mobility device of FIG. 1A configured as a wheelchair.

Referring now to FIG. 2, illustrated is a left side elevation view of a second configuration of the personal mobility device 100 of FIG. 1A configured as a wheelchair 200. In this configuration, the front and rear floor panels 181, 182, respectively, are coupled to the left and right lower rails 115, 125, respectively, (125 not visible). The seat 170 comprises an outer seat structure 272 and an inner seat structure 273 slidably coupled within the outer seat structure 272. The outer seat structure 272 is rotatably coupled to the left and right rear vertical supports 114, 124, respectively, (124 not visible). The inner seat structure 273 is rotatably coupled to the left and right intermediate vertical supports 111, 121, respectively, (121 not visible). A first plurality of attach points 201*a*-201*n* on the left rear vertical support 114 provide a variety of points at which to attach one end 271 of the outer seat structure 272. A second plurality of attach points 202*a*-202*n* on the left intermediate vertical support 111 provide a variety of points at which to attach an end 274 of the inner seat structure 273. (See FIG. 3) The inner seat structure 273 is slidably coupled within the outer seat structure 272 to accommodate a variety of lengths that may be necessary as the seat 170 is positioned at a desirable height and angle for the occupant. The seat 170 may be rotatably coupled to the vertical supports in a variety of ways well known in the art, e.g., a spring-loaded barrel bolt into an aperture on the vertical supports. A third plurality of attach points 203*a*-203*n* on the left front vertical support 112 are also provided. Their function will be discussed below. The left and right main mobility wheels 151, 152, respectively, may have left and right hand rails 151*a*, 152*a* for manual propulsion of the device 200. The left and right main mobility wheels 151, 152 may be available in different diameters to accommodate the reach of the occupant. The left and right main mobility wheels 151, 152 may also be vertically coupled at different attach points 202*a*-202*n* to compensate for the larger or smaller wheel diameter so long as the left and right bottom rails 115, 125 do not contact the surface on which the wheels roll. The device 200 may further comprise motors 210*a* interposed the main mobility wheels 151, 152 and their respective vertical supports 111, 121. Alternatively, the motors 210*b* may be friction drive motors configured to contact an outer surface of the main mobility wheels 151, 152. A battery (not shown) may be positioned in any convenient location, e.g., on the rear floor panel 182. Motor controls may be located on or near the upper rails 113, 123 and wires routed through the structural tubing which makes up the frame. Power Assist Wheels™ are additionally available as replacements for standard wheels, and are operated through a battery pack at the wheel axis.

Figure 3:
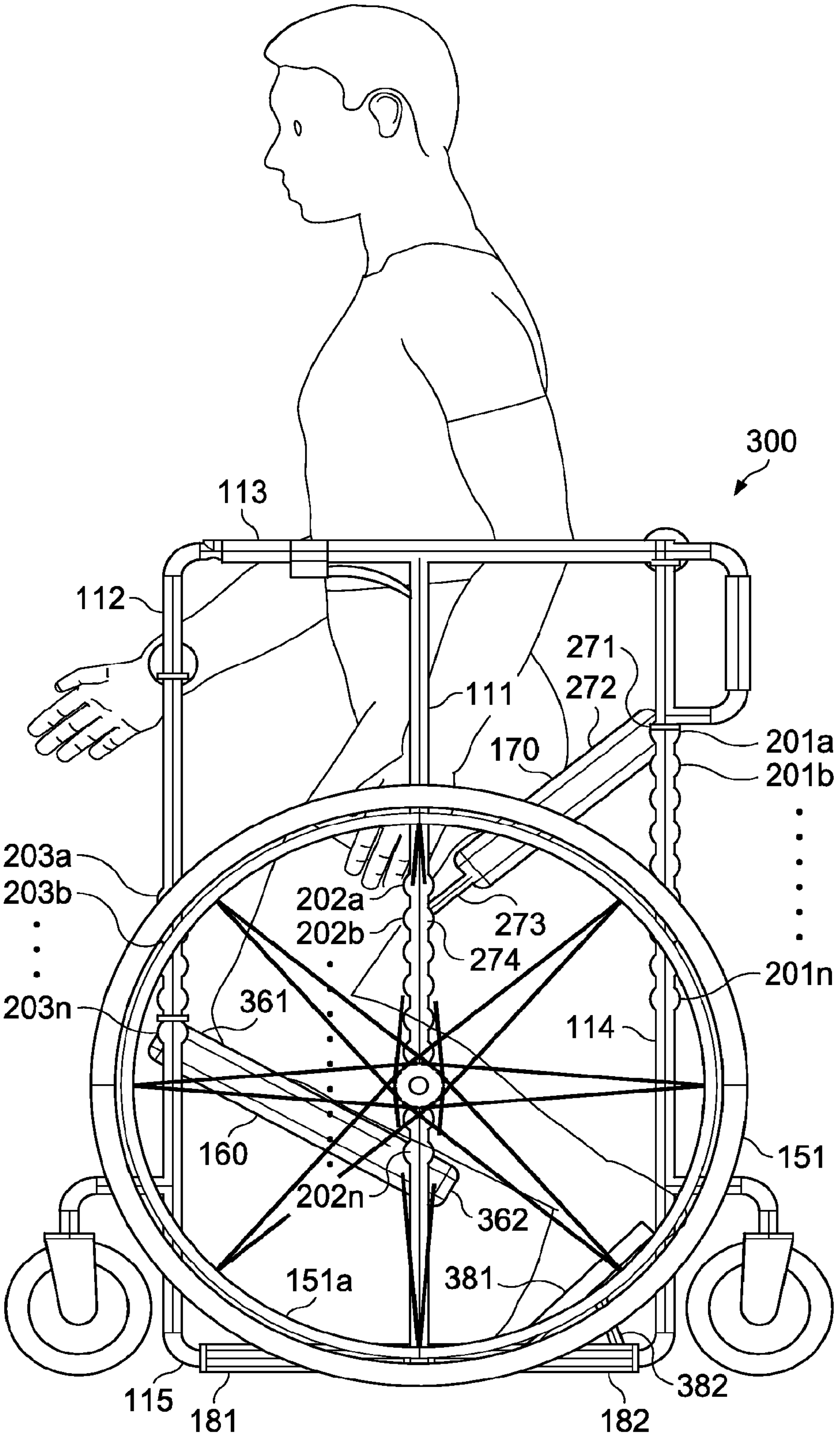
FIG. 3 is a left side elevation view of a third configuration of the personal mobility device of FIG. 1A configured as an occupant-propelled kneeling vehicle.

Referring now to FIG. 3, illustrated is a left side elevation view of a third configuration of the personal mobility device 100 of FIG. 1A configured as an occupant-propelled kneeling vehicle 300. In this configuration, the front and rear floor panels 181, 182, respectively, are coupled to the left and right bottom rails 115, 125, respectively, (125 not visible) as in FIG. 2. However, the rear floor panel 182 has a foot rest 381 rotatably coupled thereto and upwardly inclined therefrom. The foot rest 381 may be rotatably coupled and supported by any convenient methods, e.g., spring-loaded barrel bolt into the rear floor panel 182 frame for pivot, and rotatable support leg 382 folding down from the foot rest 381 to engage a recess in the rear floor panel 182. The outer seat structure 272 has been moved vertically on the left and right rear vertical supports 114, 124 (124 not visible). The inner seat structure 273 is rotatably coupled to the left and right intermediate vertical supports 111, 121, respectively, (121 not visible) as before, but at a higher location. The inner seat structure 273 is slidably coupled within the outer seat structure 272 to accommodate a variety of lengths that are necessary as the seat 170 is positioned at a desirable height and angle for the occupant's kneeling position. The knee rest 160 comprises an outer knee rest structure 361 and an inner knee rest structure 362. The outer knee rest structure 361 rotatably couples to the left and right front vertical supports 112, 122 (122 not visible). The inner knee rest structure 362 rotatably couples to the left and right intermediate vertical supports 111, 121 (121 not visible). The seat 170 and knee rest 160 are adjusted for the comfort of the occupant. Thus, as an occupant-propelled mobility device, the occupant may operate the main mobility wheels 151, 152 with his/her hands.

Figure 4A:
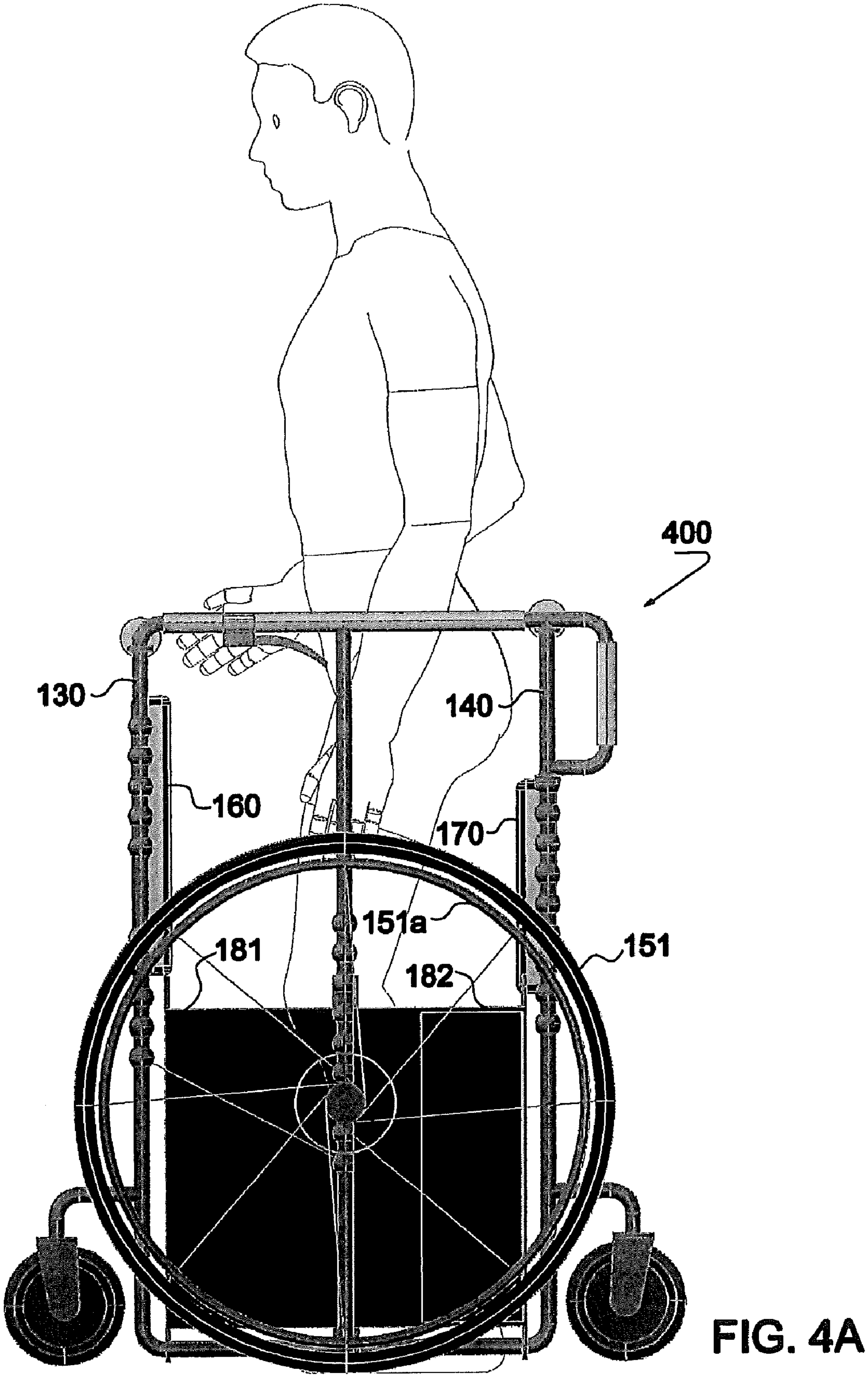
FIG. 4A is a left side elevation view of a fourth configuration of the personal mobility device of FIG. 1A configured as a self-propelled walker.
Figure 4B:
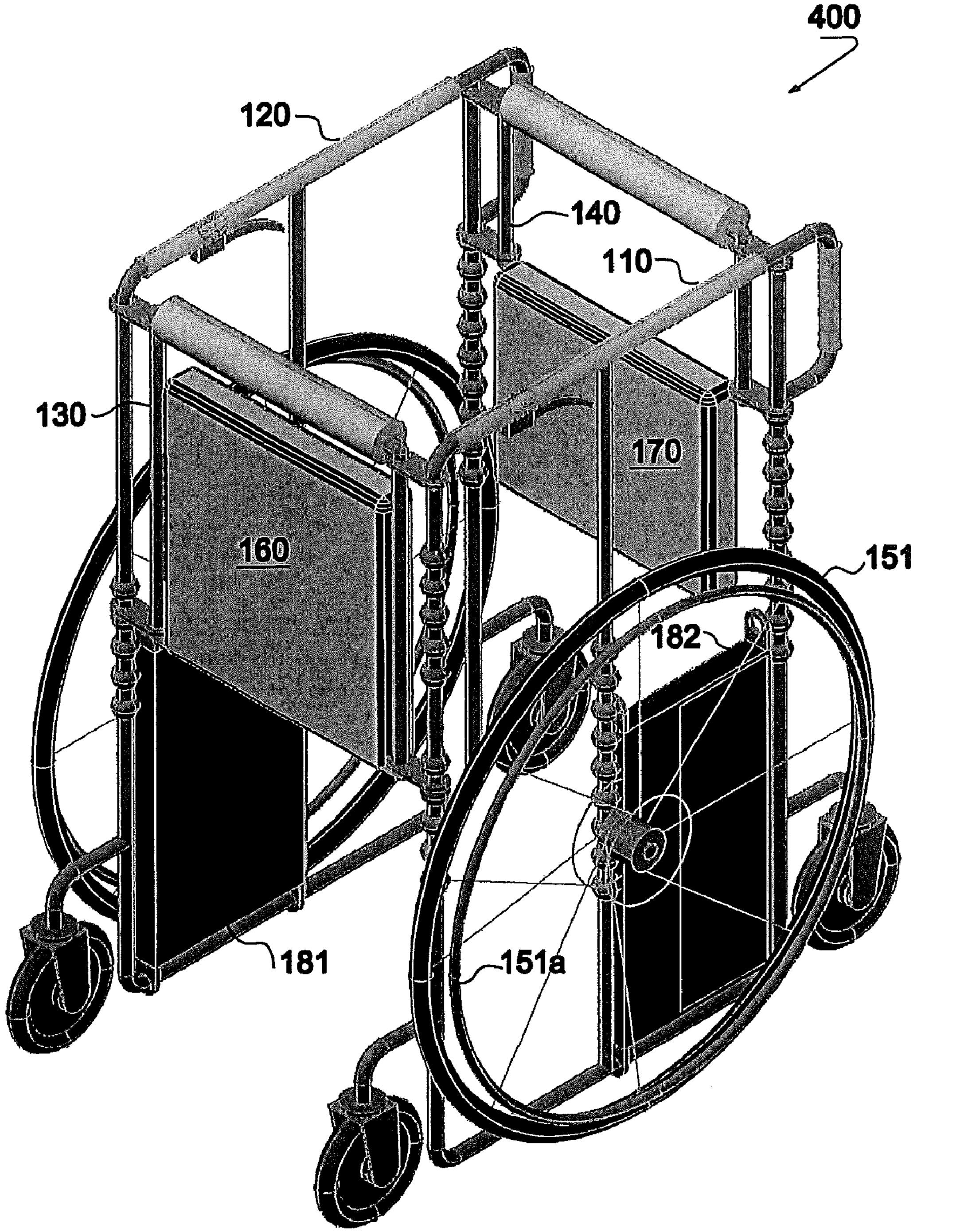
FIG. 4B is a left front isometric view of the self-propelled walker of FIG. 4A.

Referring now to FIG. 4A, illustrated is a left side elevation view of a fourth configuration of the personal mobility device 100 of FIG. 1A configured as a self-propelled walker 400. In this configuration 400, the knee rest 160 and the seat 170 are rotated to substantially-vertical positions within the front and rear structures 130, 140, respectively. Referring now to FIG. 4B, illustrated is a left front isometric view of the self-propelled walker 400 of FIG. 4A. The front and rear floor panels 181, 182, respectively, are rotated to substantially-vertical positions within the right and left side structures 120, 110, respectively.

Figure 5A:
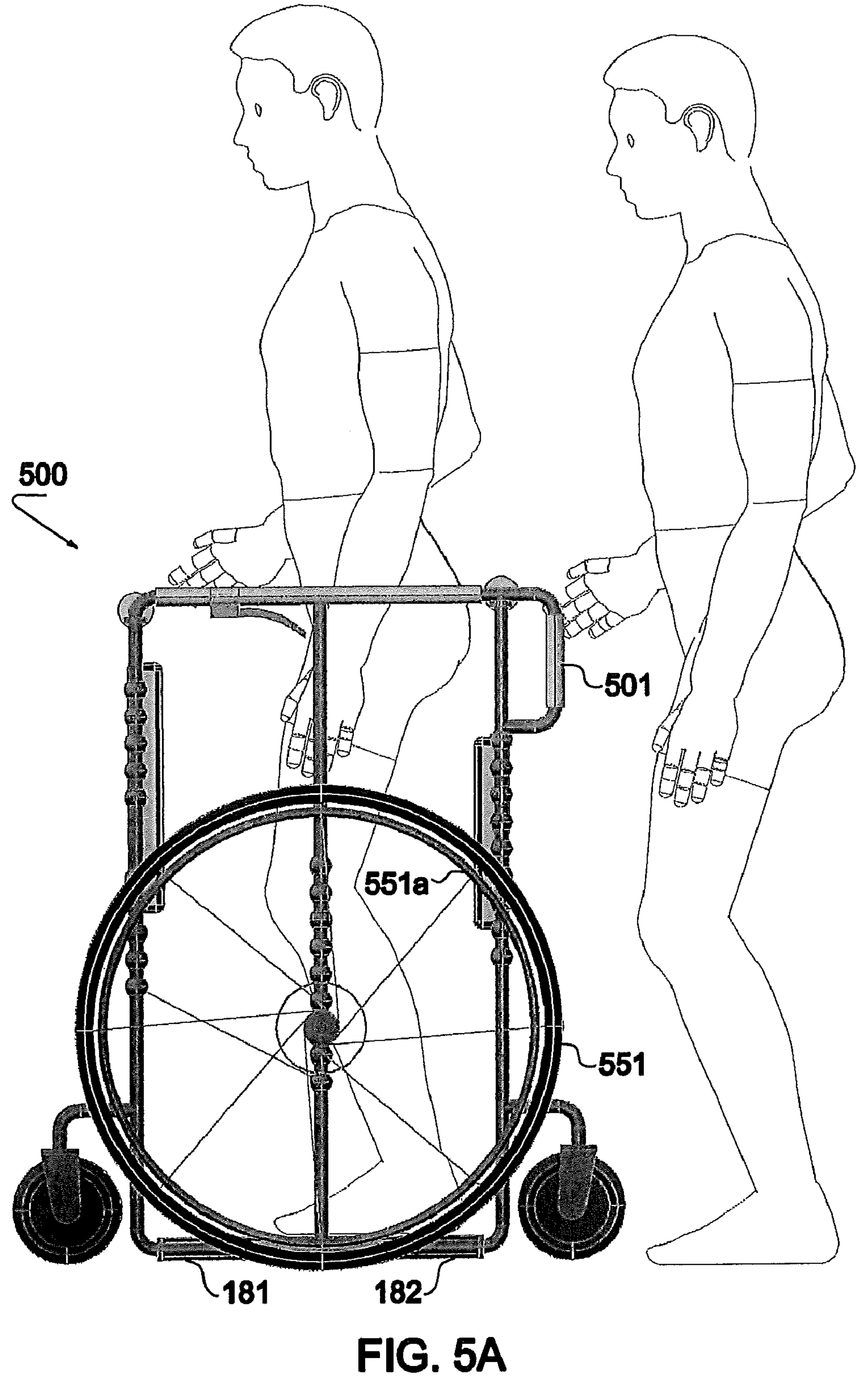
FIG. 5A is a left side elevation view of a fifth configuration of the personal mobility device of FIG. 1A configured as an attendant-propelled or occupant-propelled standing mobility device.

Referring now to FIG. 5A, illustrated is a left side elevation view of a fifth configuration of the personal mobility device 100 of FIG. 1A configured as an attendant-propelled or occupant-propelled standing mobility device 500. In this configuration 500, the knee rest 160 and the seat 170 are rotated to substantially-vertical positions within the front and rear structures 130, 140, respectively. The front and rear floor panels 181, 182, respectively, are rotated to substantially-horizontal positions and each is coupled to both the right and left bottom rails 125, 115, respectively (125 not visible). With the occupant standing on the front and rear floor panels 181, 182, respectively, the attendant may propel the standing mobility device 500 with handles 501. However, as the main mobility wheels 551, 552 (552 not visible) may be changed for an appropriate size and vertical attach point whereby the occupant can access the hand rails 551*a*, 552*a* (552*a* not visible), the occupant may self-propel the standing mobility device 500.

Figure 5B:
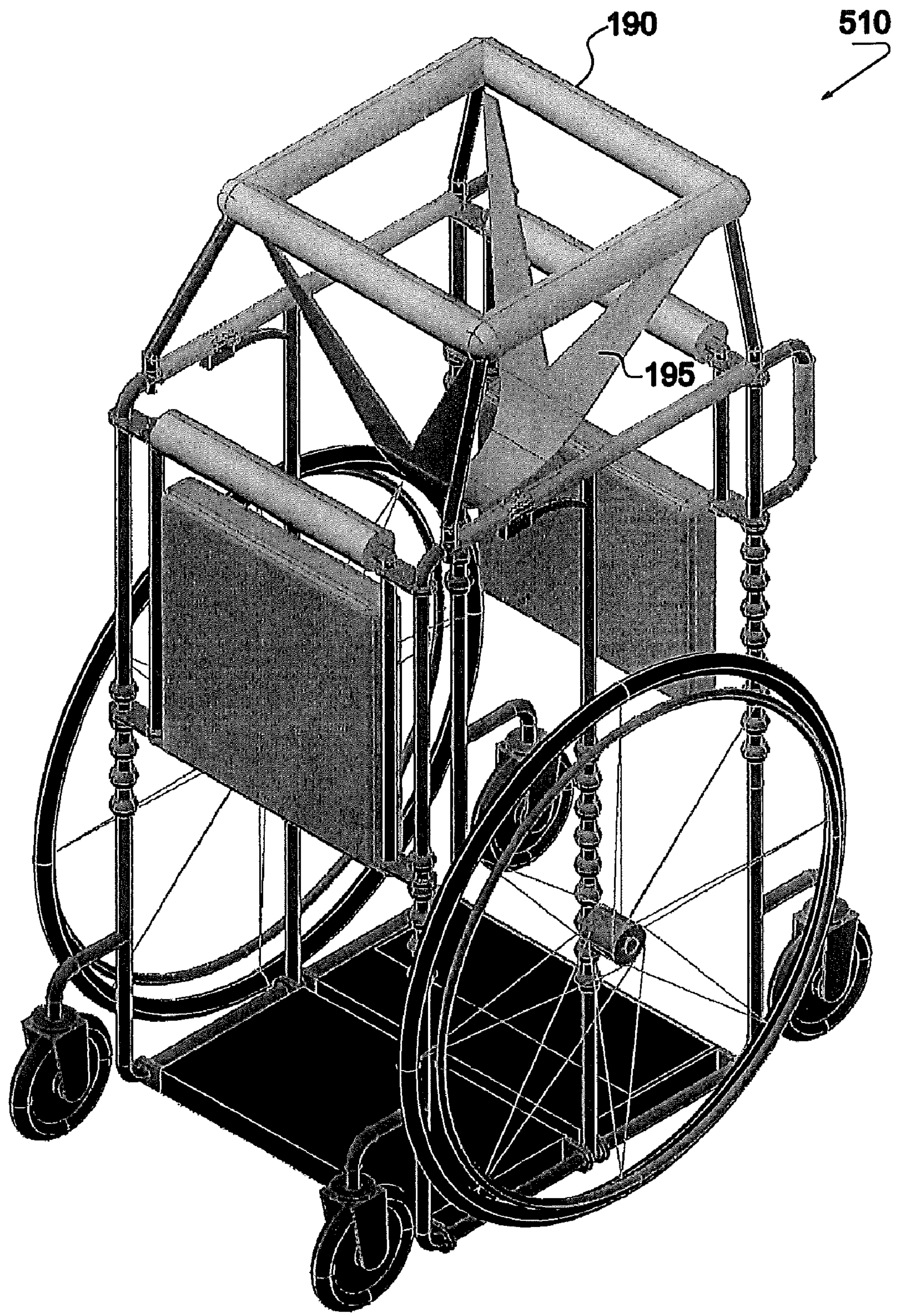
FIG. 5B is a left front isometric view of a sixth configuration of the personal mobility device of FIG. 1A configured as an attendant-propelled standing mobility device.

Referring now to FIG. 5B, illustrated is a left front isometric view of a sixth configuration of the personal mobility device 100 of FIG. 1A configured as an attendant-propelled standing mobility device 510. In this configuration 510, the occupant is assisted in standing with the optional upper torso support 190 and optional body sling 195. Operation of this configuration is the same as the configuration 500 of FIG. 5A. With support surrounding the user's midsection and two large attached wheels, the device allows for a more stabilized, safer and potentially faster gait than standard walkers.

Figure 5C:
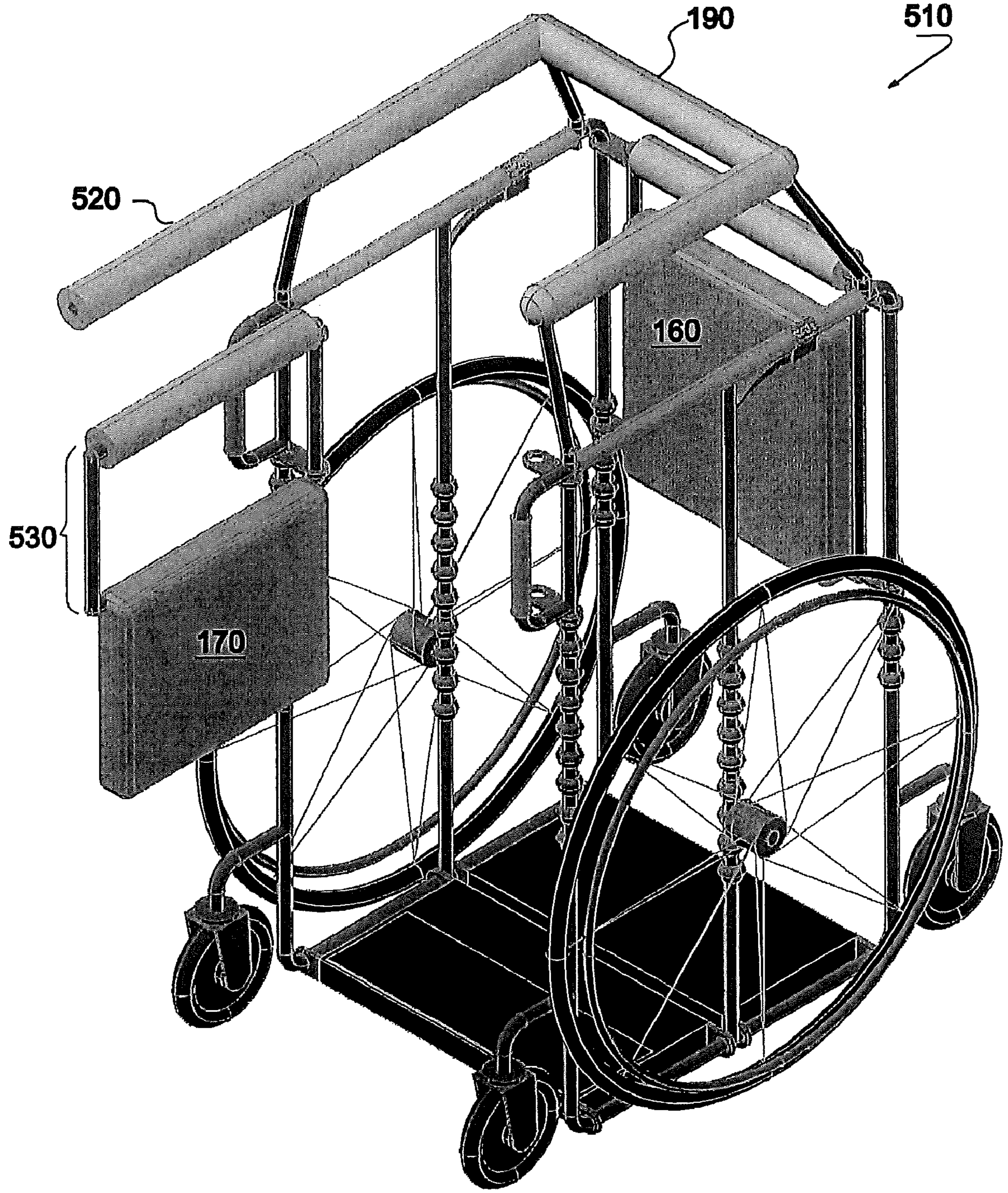
FIG. 5C is a right rear isometric view of the configuration of the personal mobility device of FIG. 5B.

Referring now to FIG. 5C, illustrated is a right rear isometric view of the configuration of the personal mobility device 510 of FIG. 5B. This FIGURE illustrates how the occupant will access the interior of the personal mobility device 510. The seat 170, a portion 520 of the upper torso support 190, and a portion 530 of the rear structure 140 have been rotated to permit access to the personal mobility device 510. One who is of skill in the art will readily understand how the body sling 195 (See FIG. 5B) would be attached to the torso support 190. The access principles illustrated here are also applicable to the configurations 300, 400 and 500.

Figure 6A:
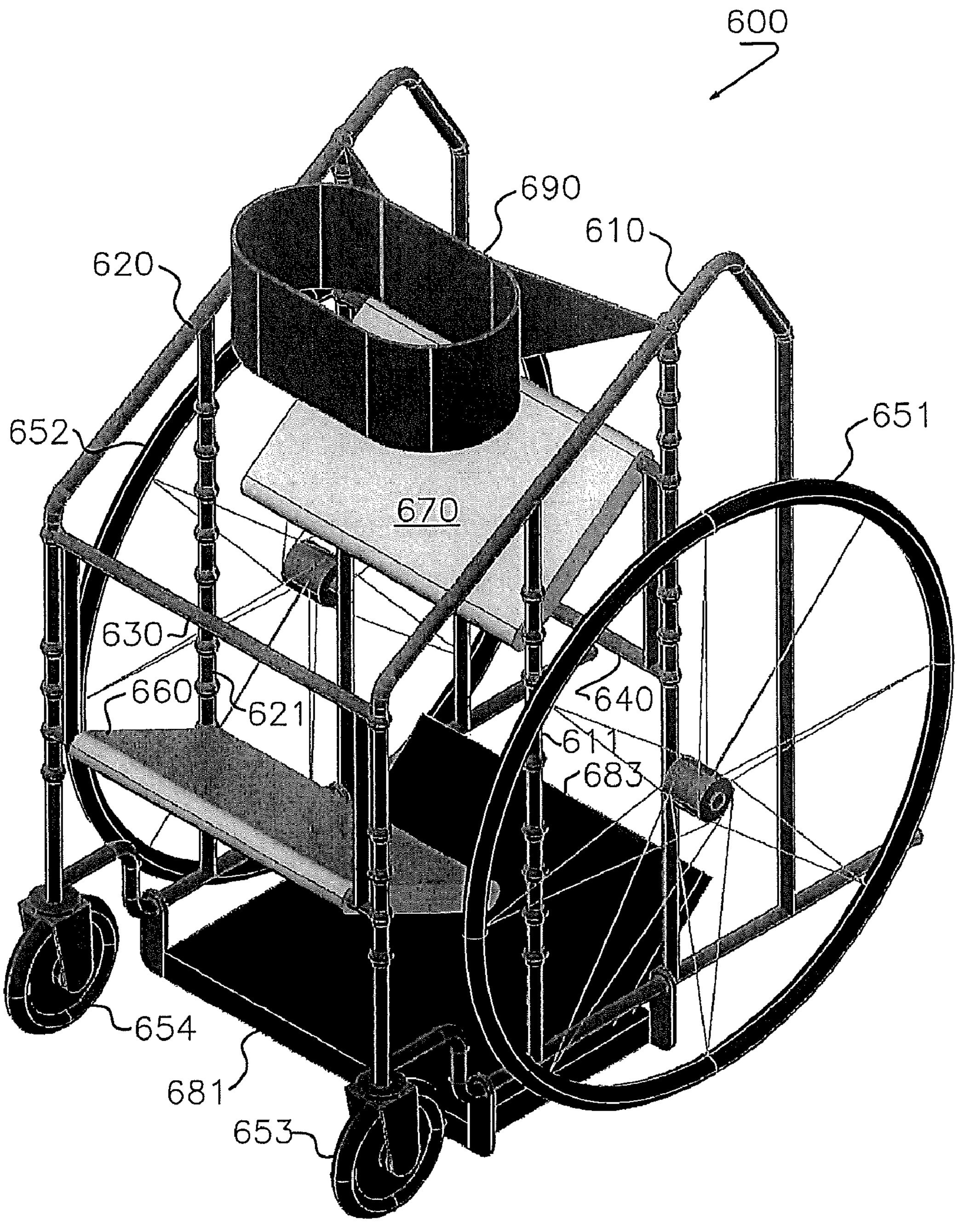
FIG. 6A is a left front isometric view of a second embodiment of a personal mobility device constructed according to the principles of the present invention.

Referring now to FIG. 6A, illustrated is a left front isometric view of a second embodiment of a personal mobility device 600 constructed according to the principles of the present invention. The personal mobility device 600 comprises an open frame having a left side structure 610; a left intermediate vertical support 611; a right side structure 620; a right intermediate vertical support 621; a front structure 630; a rear structure 640; left and right main mobility wheels 651; 652, respectively; left and right auxiliary wheels 653-654; optional left and right motors 655, 656; a knee rest 660; a seat 670; a floor panel 681; a foot rest 683; and a waist support band 690. Note that this embodiment will function in a manner similar to the first embodiment configuration 300 of FIG. 3. That is, the seat 670 is rotatably coupled to the rear structure 640 and the left and right intermediate vertical supports 611, 621. The knee rest 660 is rotatably coupled to the front structure 630 and the left and right intermediate vertical supports 611, 621. Alternatively, the knee rest 660 and seat 670 may be rotatably coupled to their respective supports by means of a ratchet mechanism, e.g., such as are found on folding ladders. The waist support band 690 may be adjustable for size through the use of hook and loop fasteners. The occupant may be assisted by an attendant pushing on the left and right side structures 610, 620 or the occupant may self-propel the mobility device 600.

Figure 6B:
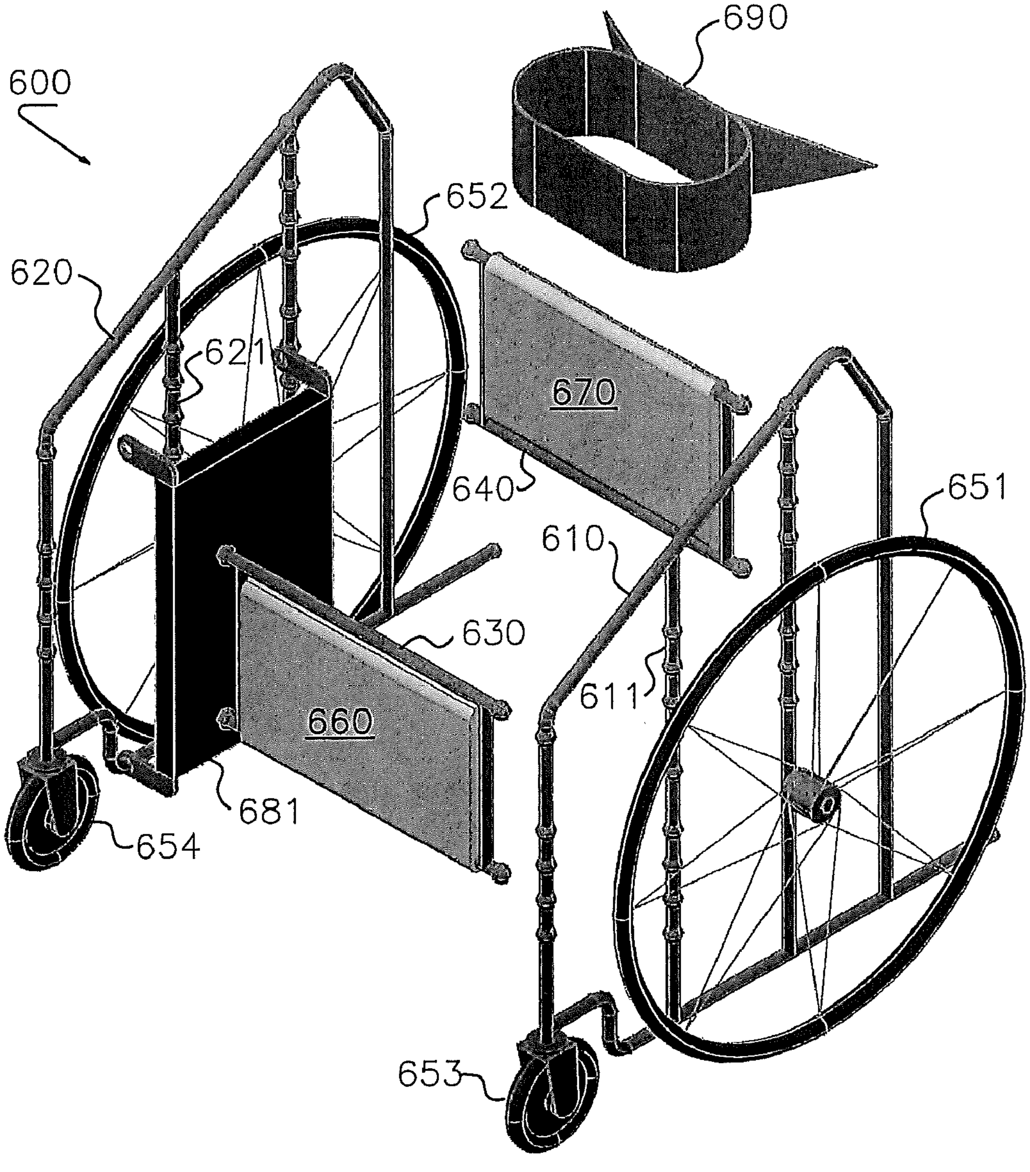
FIG. 6B is a left front partially-exploded, isometric view of the personal mobility device of FIG. 6A.

Referring now to FIG. 6B, illustrated is a left front partially-exploded, isometric view of the personal mobility device 600 of FIG. 6A. Note that the floor panel 681 folds into the right side structure 620 and the knee rest 660 and seat 670 detach from the left and right side structures 610, 620.

Figure 6C:
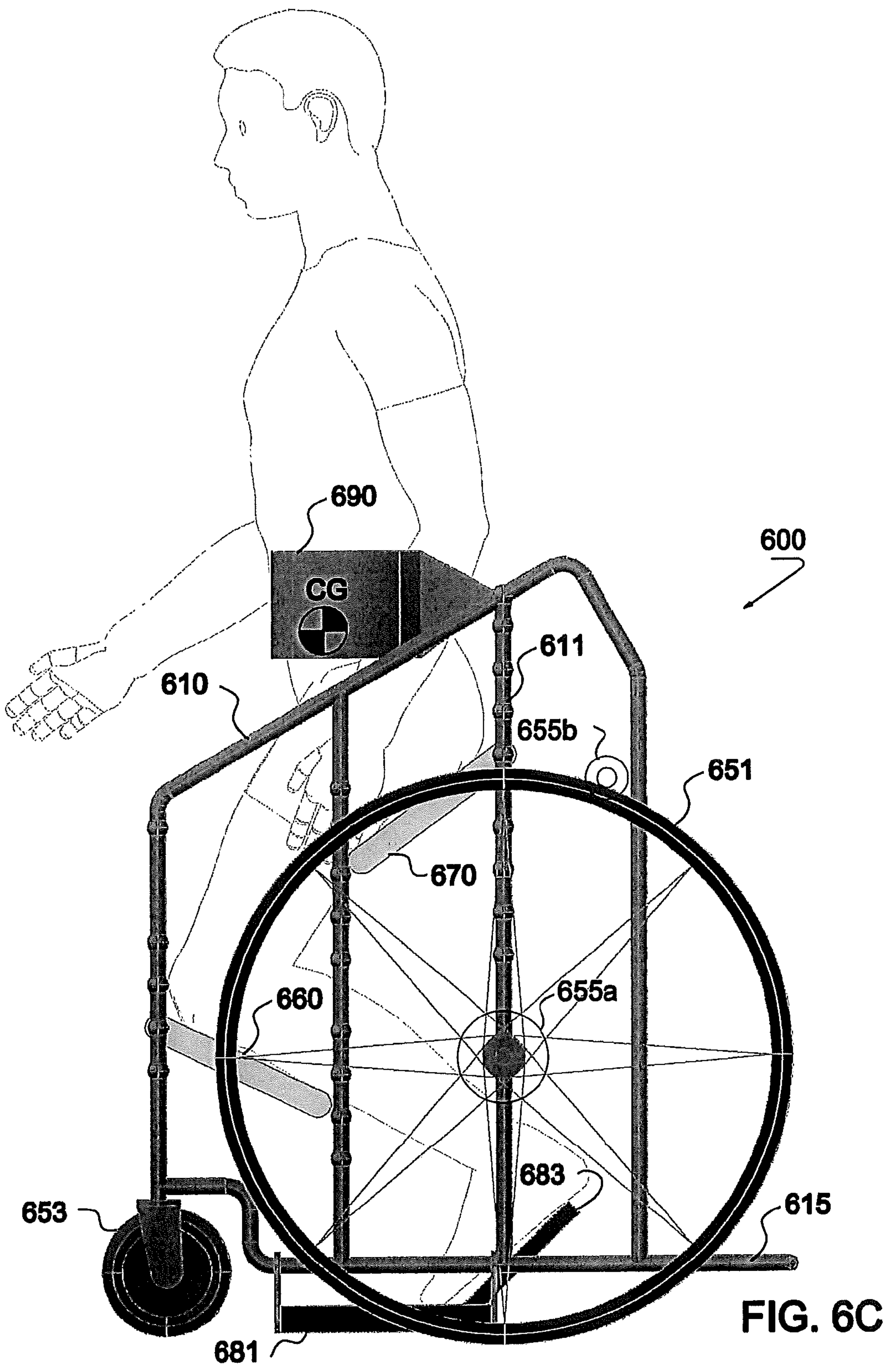
FIG. 6C is a left side elevation view of the personal mobility device of FIG. 6A.

Referring now to FIG. 6C, illustrated is a left side elevation view of the personal mobility device 600 of FIG. 6A. The advantage of this embodiment is that it uses fewer parts and only four wheels. By attaching the seat 670 to the vertical support 640 which also is the attach point for the hub 657 of the main mobility wheel 651, the center of gravity of the device and occupant always remains between the left and right auxiliary wheels 653-654 and the main mobility wheels 651, 652.

Those skilled in the art understand that while the embodiments described above each include a knee rest, a seat, and a floor panel, embodiments may exist wherein any one or more of those elements may be omitted and yet remain within the purview of the disclosure. Moreover, those skilled in the art to which this application relates will appreciate that other and further additions, deletions, substitutions and modifications may be made to the described embodiments, such as, but not limited to levered arms to replace attach point connections or track wheels to replace spring-loaded angle foot rests.

What is claimed is:

1. A personal mobility device, comprising:

an open frame having a front structure, a rear structure, and a side structure, said side structure having an upper rail and a lower rail coupleable to said front structure and said rear structure;

a main mobility wheel coupled to said side structure; and a knee rest rotatably coupled to said front structure, said knee rest adjustable from a first substantially-vertical position to a second rearwardly and downwardly-angled position from said front structure.

2. The mobility device as recited in claim 1 wherein said knee rest comprises an outer knee rest structure and an inner knee rest structure slidably coupled within said outer knee rest structure, and wherein said knee rest is adjustably coupleable to said side structure.

3. The mobility device as recited in claim 1 further comprising an intermediate vertical support coupled to said upper rail and said lower rail, and wherein said main mobility wheel is adjustably coupled to said intermediate vertical support.

4. The mobility device as recited in claim 3 further comprising an electric motor coupled to said main mobility wheel and configured to propel said mobility device.

5. The mobility device as recited in claim 1 wherein said lower rail comprises a bottom rail coupled to said front structure and said rear structure, and further comprising a rear floor panel rotatably coupled to said bottom rail.

6. The mobility device as recited in claim 5 further comprising a foot rest rotatably coupled to said rear floor panel.

7. The mobility device as recited in claim 6 wherein said foot rest rotates between a substantially-horizontal stowed position and a rearwardly and upwardly inclined foot-support position.

8. The mobility device as recited in claim 1 further comprising a seat rotatably coupled to said rear structure.

9. The mobility device as recited in claim 8 wherein said seat comprises an outer seat structure and an inner seat structure slidably coupled within said outer seat structure, and wherein said seat is adjustably coupleable to said side structure.

10. The mobility device as recited in claim 1 further comprising:

an opposing side structure having an opposing upper rail and an opposing lower rail;

an opposing intermediate vertical support coupled to said opposing upper rail and said opposing lower rail, wherein said knee rest removably couples to said opposing intermediate vertical support when in said downwardly-angled position; and a front floor panel rotatably coupled to said opposing lower rail.

11. The mobility device as recited in claim 1 further comprising a hand rail coupled to said main mobility wheel, and wherein said main mobility wheel is sized and coupled to said side structure whereby a standing occupant within said mobility device may operate said main mobility wheel to propel said mobility device.

12. A method of manufacturing a personal mobility device, comprising:

providing an open frame having a front structure, a rear structure, and a side structure, said side structure having an upper rail and a lower rail coupleable to said front structure and said rear structure;

coupling a main mobility wheel to said side structure; and rotatably coupling a knee rest to said front structure, said knee rest adjustable from a first substantially-vertical position to a second downwardly-angled position from said front structure.

13. The method as recited in claim 12 further including coupling an intermediate vertical support to said upper rail and said lower rail, and further wherein said knee rest comprises an outer knee rest structure and an inner knee rest structure, and further comprising:

slidably coupling said inner knee rest structure within said outer knee rest structure; and adjustably coupling said knee rest to said intermediate vertical support.

14. The method as recited in claim 12 further comprising:

coupling an intermediate vertical support to said upper rail and said lower rail; and adjustably coupling said main mobility wheel to said intermediate vertical support.

15. The method as recited in claim 14 further comprising coupling an electric motor to said main mobility wheel and configuring said electric motor to propel said mobility device.

16. The method as recited in claim 12 wherein said lower rail comprises a bottom rail coupled to said front structure and said rear structure, and further comprising rotatably coupling a rear floor panel to said bottom rail.

17. The method as recited in claim 16 further comprising rotatably coupling a foot rest to said rear floor panel.

18. The method as recited in claim 17 further comprising configuring said foot rest to rotate between a substantially-horizontal stowed position and a rearwardly and upwardly inclined support position.

19. The method as recited in claim 12 further comprising rotatably coupling a seat to said rear structure.

20. The method as recited in claim 19 wherein said seat comprises an outer seat structure and an inner seat structure, and further comprising slidably coupling said inner seat structure within said outer seat structure, and adjustably coupling said seat to said side structure.

21. The method as recited in claim 12 further comprising:

providing an opposing side structure having an opposing upper rail and an opposing lower rail;

coupling an opposing intermediate vertical support to said opposing upper rail and said opposing lower rail;

removably coupling said knee rest to said opposing intermediate vertical support when in said downwardly-angled position; and rotatably coupling a front floor panel to said opposing lower rail.

22. The method as recited in claim 12 further comprising:

coupling a hand rail to said main mobility wheel; and sizing and coupling said main mobility wheel to said side structure whereby a standing occupant within said mobility device may operate said main mobility wheel to propel said mobility device.

* * * * *